US011596126B2

(12) United States Patent
Wilson et al.

(10) Patent No.: US 11,596,126 B2
(45) Date of Patent: Mar. 7, 2023

(54) POWERED SMART DOG TETHER

(71) Applicant: JW Pet Products LLC, New Albany, OH (US)

(72) Inventors: John Wilson, New Albany, OH (US); Paul R. Metcalfe, Solon, OH (US); Scott E. Urban, University Hts., OH (US)

(73) Assignee: JW Pet Products LLC, New Albany, OH (US)

( * ) Notice: Subject to any disclaimer, the term of this patent is extended or adjusted under 35 U.S.C. 154(b) by 0 days.

(21) Appl. No.: 17/363,762

(22) Filed: Jun. 30, 2021

(65) Prior Publication Data
US 2022/0030826 A1 Feb. 3, 2022

Related U.S. Application Data

(60) Provisional application No. 63/045,937, filed on Jun. 30, 2020.

(51) Int. Cl.
*A01K 1/04* (2006.01)
*A01K 27/00* (2006.01)

(52) U.S. Cl.
CPC ............. *A01K 1/04* (2013.01); *A01K 27/004* (2013.01)

(58) Field of Classification Search
CPC ...... A01K 1/04; A01K 27/004; A01K 15/023; B65H 75/4442
USPC ................ 242/394, 394.1; 119/769
See application file for complete search history.

(56) References Cited

U.S. PATENT DOCUMENTS

| | | | | |
|---|---|---|---|---|
| 2,518,934 A | * | 8/1950 | Renner | A62B 1/10 242/396.9 |
| 4,344,587 A | * | 8/1982 | Hildreth | A01K 89/017 242/301 |
| 5,246,331 A | * | 9/1993 | Hallahan | E06B 3/6733 414/676 |
| 6,523,500 B1 | | 2/2003 | Zenteno | |
| 6,904,871 B1 | | 6/2005 | Archetti et al. | |
| 6,904,872 B2 | * | 6/2005 | Muller | B65H 75/4431 119/796 |
| 7,475,842 B2 | * | 1/2009 | Campbell | G01B 3/1005 242/390.8 |
| 7,493,873 B2 | | 2/2009 | Petersen | |
| 7,673,588 B2 | | 3/2010 | Head | |
| 7,730,852 B2 | | 6/2010 | Kramer | |
| 7,866,282 B2 | | 1/2011 | Simpson et al. | |

(Continued)

FOREIGN PATENT DOCUMENTS

| | | | | |
|---|---|---|---|---|
| DE | 102007029662 B4 | * | 5/2021 | ............ B60T 13/741 |
| WO | WO 97/42117 | | 11/1997 | |

(Continued)

*Primary Examiner* — Timothy D Collins
*Assistant Examiner* — Maria E Graber
(74) *Attorney, Agent, or Firm* — Lippes Mathias LLP

(57) ABSTRACT

An animal tether system and method wherein the rate of extension and retraction of the tether and/or the length of the tether can be actively controlled at least in part as a function of the angular direction and/or speed and/or length of which the tether extends/retracts. The system can be used to maintain an animal in a non-circular boundary, such as a rectangular space, by controlling how far the tether can extend at certain angular positions. The system also allows a user to block off certain areas within a space from access by the animal.

15 Claims, 13 Drawing Sheets

(56) References Cited

U.S. PATENT DOCUMENTS

| | | | |
|---|---|---|---|
| 8,253,572 B2 | 8/2012 | Lytle, Jr. | |
| 8,307,789 B2 | 11/2012 | Stuerke | |
| 8,516,979 B2 * | 8/2013 | Ek | A01K 27/004 |
| | | | 119/796 |
| 8,955,464 B2 | 2/2015 | Lytle, Jr. | |
| 9,480,241 B2 | 11/2016 | Holmstrom | |
| 9,603,341 B2 * | 3/2017 | Scaba | A01K 27/004 |
| 9,637,085 B2 * | 5/2017 | Sanchez Huipio | B60R 22/343 |
| 9,848,583 B2 * | 12/2017 | Smith | A01K 27/004 |
| 9,943,071 B2 | 4/2018 | Hill | |
| 10,412,934 B2 | 9/2019 | Max et al. | |
| 10,750,721 B2 * | 8/2020 | Morin | H02J 50/10 |
| 2007/0131177 A1 * | 6/2007 | Perkitny | A01K 27/004 |
| | | | 119/796 |
| 2007/0215064 A1 | 9/2007 | Petersen | |
| 2010/0107992 A1 | 5/2010 | Chefetz | |
| 2011/0120389 A1 * | 5/2011 | Yackley | A01K 27/004 |
| | | | 119/796 |
| 2011/0181423 A1 * | 7/2011 | Lytle, Jr. | B60T 7/12 |
| | | | 119/796 |
| 2014/0041598 A1 | 2/2014 | Lytle, Jr. | |
| 2017/0000088 A1 * | 1/2017 | Smith | A01K 27/004 |
| 2019/0141957 A1 | 5/2019 | Pfahnl et al. | |
| 2021/0368741 A1 * | 12/2021 | Duffin | B65H 75/406 |

FOREIGN PATENT DOCUMENTS

| | | | |
|---|---|---|---|
| WO | WO 99/20102 | 4/1999 | |
| WO | WO-03068125 A2 * | 8/2003 | A61G 5/023 |
| WO | WO2006/099431 | 9/2006 | |
| WO | WO2012/042205 | 4/2012 | |
| WO | WO-2016004273 A1 * | 1/2016 | A01K 27/004 |
| WO | WO2017/197106 A1 | 11/2017 | |

* cited by examiner

POWERED SMART DOG TETHER

BACKGROUND

The present exemplary embodiment relates to animal tethers. It finds particular application in conjunction with an automated tether system for a dog or other animal, and will be described with particular reference thereto. However, it is to be appreciated that the present exemplary embodiment is also amenable to other like applications.

Animals, including but not limited to dogs, are often tethered to a stake installed in the ground with a fixed-length tether (e.g., chain, cable or rope). In some instances, a spring-return coil spool is provided to take up/pay out a variable length cable or rope. In either arrangement, the animal is generally confined to a circular shaped area.

Existing animal tethers may perform suitably in some applications, but in many instances the ability of the animal to roam freely within the circular area can present problems. When a dog chases something at a high rate of speed there is no available deceleration other than the abrupt end-of-line pull on the dog's collar when the dog reaches the perimeter of the circular area. This can injure the animal and be an unfavorably emotional experience for all involved. In extreme cases, the stake can be pulled from the ground leaving the animal free to wander from the confined area. The circular shaped confined area can also be a risk to the safety of the animal if there is an obstacle within the perimeter that the animal can run into and become injured, or wrap the tether around the obstacle and become entangled. To avoid or mitigate these issues, the cable or rope can be shortened but this then makes the confined area smaller, which is generally not ideal.

In some locations, laws, regulations or rules prohibit an animal from being left unattended in a yard.

BRIEF DESCRIPTION

Animal tethering devices have remained quite primitive over the years with little innovation other than implementation of a fixed force metal coil spring enabling primitive recoiling of the cable back to the ground stake. The present disclosure sets forth an animal tethering system that is controllable in many ways and is far superior to the current simple stake-and-cable systems. Tethering systems in accordance with the present disclosure provide a level of monitoring and control over the animal that, in some instances, can allow a pet owner to avoid running afoul of laws, regulations or rules that prohibit animals being left unattended.

Aspects of the present disclosure are directed to an animal tether system and method wherein the rate of extension and retraction of the tether and/or the length of the tether can be actively controlled at least in part as a function of the angular direction and/or length and/or speed of which the tether extends/retracts. The system can be used to maintain an animal in a non-circular boundary, such as a rectangular space, by controlling how far the tether can extend at certain angular positions. The system also allows a user to block off certain areas within a space from access by the animal.

A system in accordance with the present disclosure provides many advantages including:
increased safety over existing ground-mounted fixed length or recoil leashes/tethers; length of cable associated with a 0 to 360-degree spool axis (compass) position resembling the control of a fence; does not require electric shock unlike nonvisible perimeter control products, and animal is securely tethered and cannot run away through nonvisible electrical field barrier product; desired perimeter contour is learned by teaching the app and hardware the extent of the perimeter; the animal can be kept a desired, programmable distance inside a fence or other area to avoid access, digging, keeping distance from humans, pets, and the like; perimeter is not limited to a circular pattern, an irregular (noncircular) pattern can be offered with control of cable length when combining one or more of the animal velocity, direction, pull force and compass orientation of the tether into the control scheme; lower cost than installing a fence around a yard, yet allows the animal to roam a greater areal extent of the yard; fences are not allowed in many home developments, yet many homeowners are pet owners that want a pet to enjoy their yard; optional rechargeable battery or other energy source as the power system without hard-wiring installation; the system can be hard-wired and increase a home's asset value for future homeowner; the elevation of the system can be manually or electronically adjusted between an above-ground surface position and a flush/below flush with ground surface to avoid damage from lawn care equipment or to reduce tripping over during yard use or children playing; optional solar panel to charge battery that can drive electronics control circuit and motor; the system can include a phone app configured to communicate with the tether device to provide control and alerts to the owner of, among other things, abnormal pet movement, and act as an interface to control multiple functions and offer two-direction communication; the system can include a motor and/or spring that can decelerate coil/line speed before reaching the end of line to avoid clotheslining (sudden deceleration) potentially injuring the pet from high velocity run out; programmable combination of cable distance, cable velocity, angular velocity of cable spool exit point (360-degree swivel) and cable tension control; motor slowly reels in pet to center stake/spool or to desired distance for any purpose via phone app or other electronic control and compass setting; remotely unleash pet to avoid humans or other pets or animals, such as neighbors, visitors expected or unexpected or to bring inside to avoid inclement weather without having to walk to the extent of the yard to reach the pet to manually unleash; generate electricity to charge battery while spool is uncoiling/extending; optionally be mounted below ground or below structure or building surface; be mounted at various heights on or in above-ground elevation on custom designed attractive pole or post, similar to 6-8 inch diameter 30 inch tall walkway light posts or the like, which can also light up the yard in the direction of the pet or a larger region, the light can be activated, light level controlled by the smart phone app or on the housing control enclosure; a photocell can be implemented to turn on to a set light level when the sun sets; the light can be programmed to turn on when based on a clock timer, the perimeter can be changed based on a given time of day and day of week based on the activity schedule of neighborhood children coming home from school, lawn maintenance or similar events, seasonal perimeter shape settings can be established and be implemented based on the calendar such as when or if plowed snow is piled in an area that restricts a larger perimeter of a yard during winter months.

In accordance with one aspect of the present disclosure, a tether system for an animal comprises a reel, a tether supported on the reel for extension and retraction in response to rotation of the reel, a motor operatively connected to the reel for rotating the reel to retract the tether, and a controller for controlling the motor to retract the tether based at least in part in data received from at least one sensor.

The system can include an angular position sensor for sensing an angular direction in which the tether extends from the reel, and a rotational sensor for sensing a rate of rotation of the reel. The system can include a brake assembly for braking rotation of the reel. The system can include a spring for rotationally biasing the reel to retract the tether. The system can include a clutch for selectively coupling the motor to the reel. The system can include a one-way bearing interposed between the motor and the reel such that the reel can rotate faster than a rate at which the motor drives the reel when retracting the tether.

In one example, the brake assembly can include a caliper and a sensor for sensing an amount of braking torque developed by the caliper. The system can include a reel cover adapted to enclose the reel, wherein the reel cover is rotatable relative to a shroud of the system in response to a change in angular direction of the tether. The reel cover can support the angular position sensor. The system can include at least one battery for providing power to at least one of the electric motor, controller, or at least one sensor. The at least one sensor can include one or more of an encoder for measuring rotation of the reel, an angular position sensor for measuring an angle of extension of the tether, or tension sensor for measuring tension in the tether. The system can include a frame supporting the reel, motor and controller, and can include at least one wheel mounted to the frame for supporting the tether system for movement across the ground.

In accordance with another aspect, a tether system for an animal comprises a reel, a tether supported on the reel for extension and retraction in response to rotation of the reel, a power brake for braking the reel, and a controller operatively coupled to the brake for controlling the brake to brake the reel based at least in part on data received from at least one sensor.

The power brake can include a rotor fixed for rotation to a shaft with the reel, and a caliper configured to be selectively actuated by the controller to apply a braking force to the rotor. The brake can include an electric actuator for selectively actuating the caliper.

In accordance with another aspect, a method for controlling a tether system for an animal comprises sensing at least one of an angular direction of extension of the tether, a radial length of the tether, or a rate of extension of the tether, and activating, at least in part based on data generated by the sensing, at least one of a brake for braking extension of the tether or a motor for retracting the tether, wherein the tether system includes a reel, a tether supported on the reel for extension and retraction in response to rotation of the reel, a motor operatively connected to the reel for rotating the reel to extend and retract the tether, and a controller for controlling the motor to extend and retract the tether based at least in part in data received from at least one sensor.

DETAILED DESCRIPTION

Figure 1:
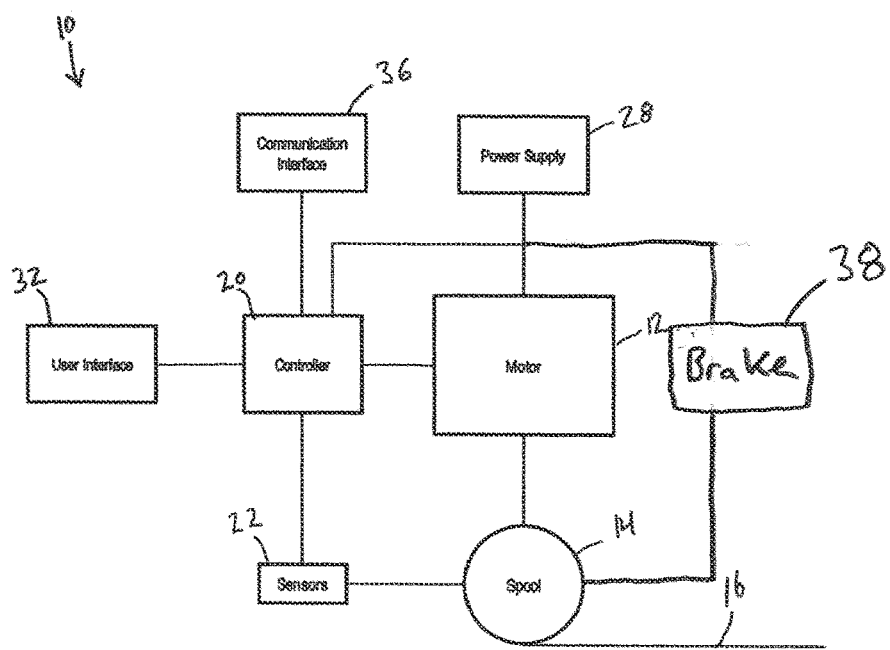
FIG. 1 is schematic illustration of a tether system in accordance with the present disclosure.

With reference to FIG. 1, a system 10 in accordance with the present disclosure is illustrated schematically and identified generally by reference numeral 10. The system 10 generally includes motor 12 drivingly connected to a reel or spool 14 for extending/retracting a cable 16. The cable spool 14 can have a vertical or horizontal axis depending on the system assembly form factor. If a flat spool side is desired parallel to the ground, the axis can be vertical. This configuration generally may offer a smaller overall vertical dimension to the system.

The motor 12 is controlled by a controller 20 which is configured to receive data from one or more sensors 22 and control the motor 12 at least in part based on information received from the one or more sensors 22. The one or more sensors 22 can include an encoder or other device for tracking rotation of the spool 14 and/or motor 12 as the cable 16 is extended and retracted. The one or more sensors 22 can further include an angular position sensor for detecting an angular direction (e.g., 0-360 degrees in the horizontal plane) in which the cable 16 extends from the spool. Other sensors can include current and/or voltage monitors for detecting a load applied to the motor 12 by the spool 14 during extension and retraction of the cable 16, sound sensors such as microphones, or vision-based sensors such as infrared or visible spectrum cameras or the like.

A power supply 28 supplies power to the components of the system 10. The power supply 28 can include one or more of a 110v AC power supply, a battery, a solar cell array, or a generator. In some embodiments, extension of the cable 16 and the resulting rotation of the spool 14 can generate power to charge a battery. Similarly, angular rotation of the spool as the animal moves about can generate power that can be utilized by the system. Power originating from an outside source can be made available through ports on the bottom or sides of a below-ground portion of a housing or enclosure of the system so as not to be visible or present a tripping hazard above ground.

The system 10 further includes a user interface 32. The user interface can be one or more buttons, a touchscreen display, or any other suitable interface. In some embodiments, the user interface is integrated into a housing of the system. In other embodiments, the user interface can be a remote user interface, such as a mobile phone, computer, or the like. To this end, a communication interface 36 is provided for handling communication between the controller 20 and a remote device (not shown). The communication device can utilize any suitable communication protocol such as WIFI, NFC, Bluetooth, cellular, etc.

The system 10 further includes a brake 38 for braking the spool 14 to control extension of the cable 16. The brake can be a powered brake powered by the power supply 28 and controlled by the controller at least in part in response to data from the one or more sensors 22. In some cases, the brake can be integral with the motor 12. In other cases, the braking function can be performed by the motor 12 such that no separate brake 38 is required.

It should be appreciated that larger animals may require or prefer a taller tether point than ground level and an associated spool center plane or cable exit from the mounted spooling system. This can come by way of a structural riser with a pulley or placement of the spool at that elevation.

Elevation of the spool relative to the ground can vary depending on other variables. The spool can be mounted below ground elevation, above ground elevation low to the ground elevation or higher above the ground elevation. If low, and the cable exit needs to be higher to accommodate a taller animal, one or more pulleys can be used to direct the cable to the desired direction of the animal movement, generally, laterally across the ground surface.

Orientation of the spool axis can be in the vertical or horizontal orientation with respect to the horizon or ground elevation. Vertical axis positioning offers a more compact vertical dimension and a flat surface which is desirable to minimize the depth of penetration into the ground surface in which it is mounted, such as a hole in soil or the like. Yet, a horizontal axis enables discharge of the cable from the spool tangent to the spool which accommodates the cable direction from a smaller angle to the horizon to a larger angle for a taller animal attachment point off the ground elevation.

There may be a desire to submerse a portion or all the assembly of the system below the ground elevation, or another structure such as a building, deck, patio, or the like. Submersing the device can be advantageous when lawn care devices, such as mowers, fertilizers, irrigators, wheeled vehicles such as bicycles, motorcycles, people, pets, or other objects traverse the area where the system is located.

The animal pull force and speed of the extendable cable can be measured in different ways. One is to utilize the motor attached to the spool to measure the pull torque and speed via an electromechanical function at the motor, acting as a force, speed and distance control or governor. Another method to measure force is to do it at an animal attachment point where the cable meets collar, halter, or the like, where a force sensor can measure the cable tension. That force can be connected via wired means through the extendable cable or wirelessly back to one or more receiving sensors at the mounted base at the origin of the extending cable, or an alternative location. One such alternative location is a smart phone that has an app that is specific to the animal control system. Another can be a wireless network in the vicinity to which one or more devices can be connected to interpret the status or control the system.

In the event of an animal owner or responsible party wants to release an animal tethered to the extendable cable (or any cable) a smartphone or computer app or switch on control housing can enable control of releasing a battery powered collar or harness mounted device that can release a clasp type mechanism. The freed animal can then be called to come to the owner or handler. This alleviates the handler from walking to the animal, making it more convenient for the animal handler. Further, if there was inclement weather, such as a rainstorm or a threat from a wild animal, or persons approaching the animal undesirably, such as an animal or a dog, the handler can remotely release the clasp and enable the pet to come out of the weather, or away from any threat without the handler having to be exposed to the inclement weather or other undesirable threat or environmental condition. The release, if not able to be unlocked without the remote control or a code would help prevent pet theft. NFC (near field communication) can also be used as a unique secure release means.

Initially, before use with an attached animal, the animal handler/owner will set the system control to a light tension on the retractable cable and walk a path near the perimeter of the defined area so the system can learn the outermost perimeter. Then, based on the velocity, distance, direction, and/or compass location of the animal moving in either direction, the system will shorten the cable in advance via computer algorithm to avoid contact with an obstacle based on aforementioned inputs.

Figure 2:
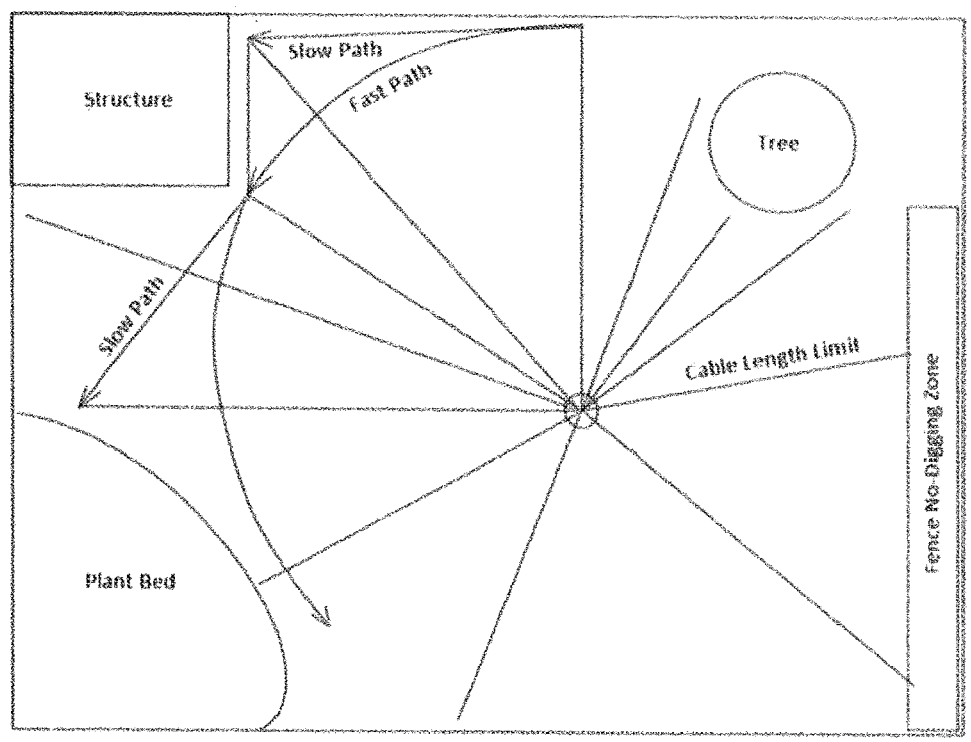
FIG. 2 is a schematic illustration of a variable contour perimeter boundary in accordance with the present disclosure.
Figure 3:
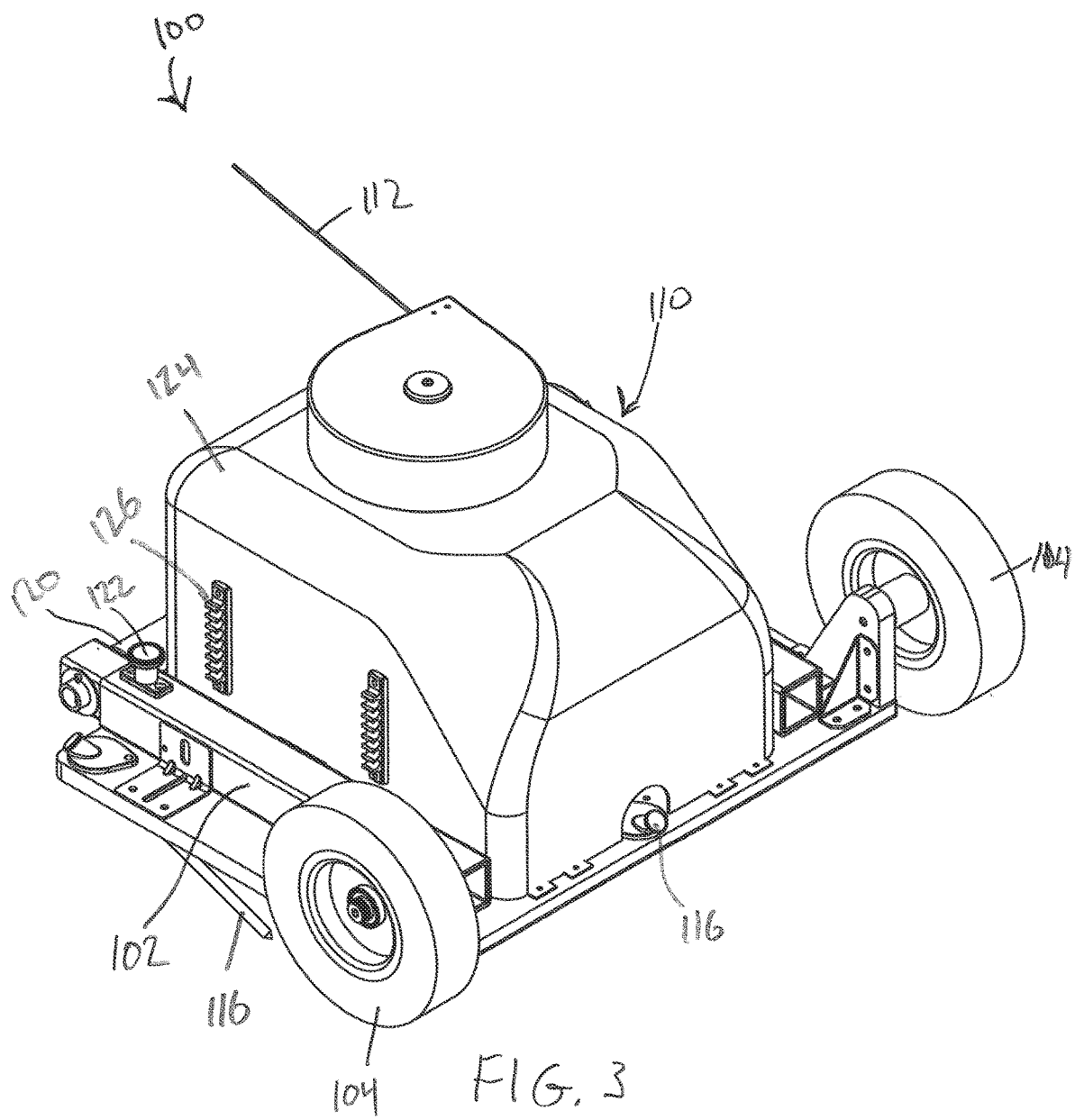
FIG. 3 is a perspective view of a tether system in accordance with the present disclosure.
Figure 4:
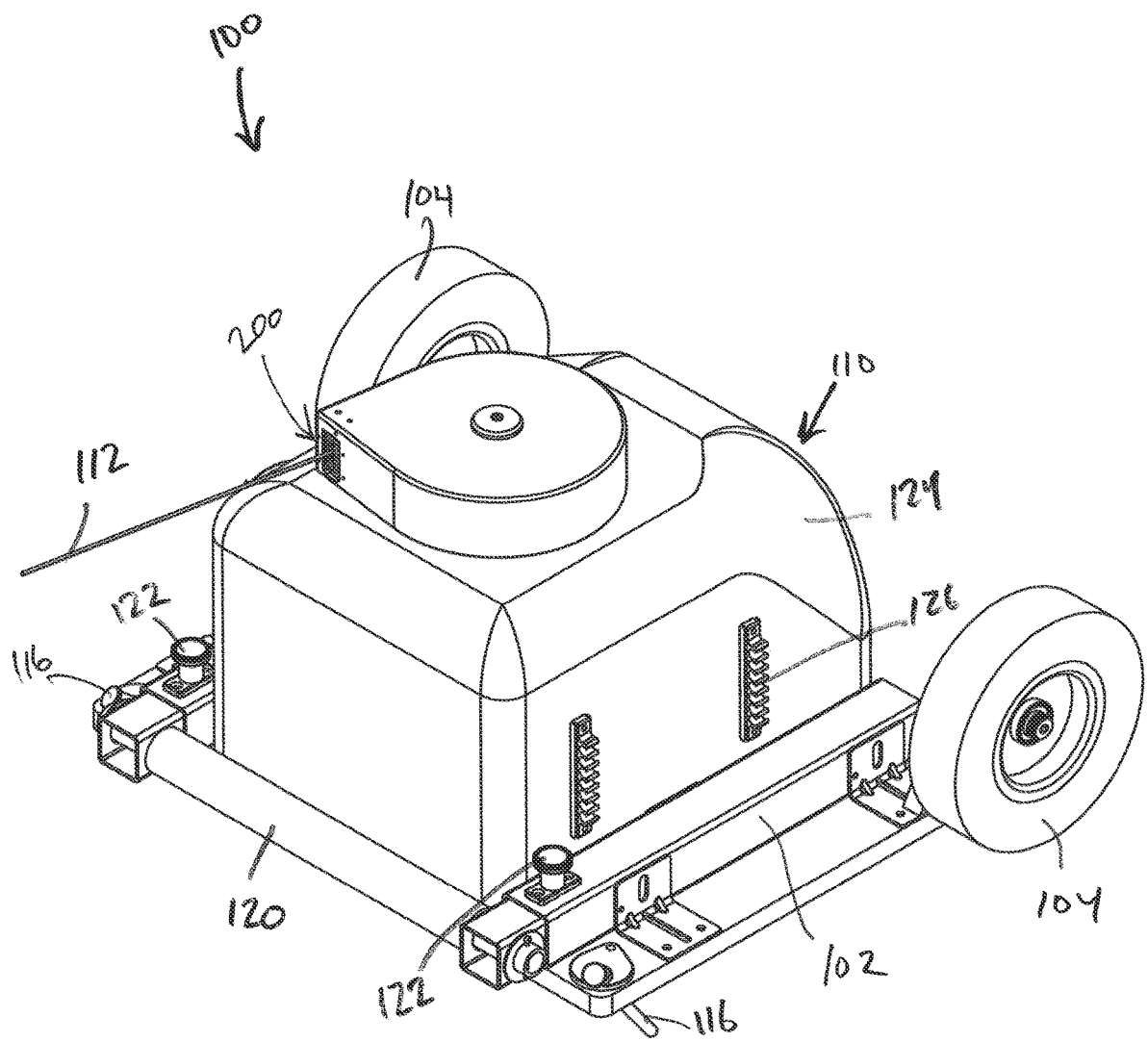
FIG. 4 is another perspective view of a tether system in accordance with the present disclosure.

In FIG. 2, it is shown that when moving in a counter-clockwise direction at a higher velocity the animal will need to be at a shorter cable length earlier in the path to avoid animal contact with obstacles based on a centripetal force effect on the animal. The same logic or algorithm applies to clockwise rotation. Other inputs can include animal weight and size to ensure adequate cable retraction force, cable retraction rate, early trigger timing of cable retraction is necessary for clearance of perimeter objects in all angular and velocity scenarios.

Further, where digging under a fence is prohibited, either manually by the walk-around training and/or an app input, (by camera image that has digital yard region exclusion capability or the like) the region boundaries can be identified and the cable will be shortened to limit access from that region. Standing objects such as trees and posts can be avoided, and the region beside and behind (at a further distance from cable spool center) same will be prohibited via shorter cable length and advance retraction and by velocity reduction by foreshortening the cable if rapidly moving toward an obstruction or prohibited area.

The movement of an animal can be cumulatively tracked and data stored and graphically presented as part of the overall system so the animal handler or owner can determine where the animal has been and if there are any dangerous scenarios which could suggest a change in the system attributes such as but not limited to the following: extendable cable length throughout the perimeter, earlier shortening (faster velocity reduction) of cable at a radial position to better avoid objects. After initial or subsequent "teaching" the perimeter to the system, further shortening or lengthening, velocity changes and angular changes for safety reasons can be implemented at will by the animal owner/handler.

Having a microphone in the vicinity of the pet that can listen to a pet's sound emitted such as a yelp when injured, a bark or any other pitch to alert a handler/owner depending on the sound frequency (yelp, bark, whining) can trigger an alarm to be sent to a smart phone app or another alerting device via programming by the owner/handler using an IF-THEN logic. The heard sound can be compared against a database of sound or simply if in a range of frequency in Hz for a duration it would trigger an alarm or notice to be sent to the owner/handler if the app field programming matched said alarm criteria. More simply, if the decibel value measured by the speaker and a decibel sensor was at an elevated average value for a set period of time, or number of instances (barks) or higher level decibel value, an alarm notice can be triggered. For example, if the dog barking for a period of 5 minutes (or some settable value in an app field) is considered incessant and/or annoying by a homeowners association, neighbor or any other entity or person, penalties, confrontations, fines or the like can be avoided by bringing the dog into the residence or attending to the pet's needs for any number of reasons in an attempt to calm or nurture the pet into conformable behavior.

Tracking an animal's movement can lead to discovering an increase or decrease in movement potentially being an indicator of a health problem or a dangerous scenario requiring attention to the animal or the controlled area. Any of the following could be a problem detected by monitoring pet movement and/or having a camera and speaker as part of the system: dehydration, animal attack, human attack, significant increase or decrease in temperature, significant precipitation, ice, snow, rain, hail and potentially more.

As the accessible area might become restricted with a temporary or permanent placement of a picnic table, swing set, children playing in a given area, a barbeque, or the like, restricting can be quickly and easily implemented by a smart phone app or the like computer control, or by manually making an adjustment at the spool housing assembly and cable end walk-around learning by "re-teaching" the system. After the temporary obstructions are removed, the default settings can be reinstated as a default setting of sorts or another walk-around can be conducted to reset the learned perimeter.

Animal owners and handlers may want to observe their animal during periods they are not in a visible line of sight yet can use a smart phone app or a computer to display images from a camera monitoring the animal. A camera or system of cameras with 360 degrees perspective or less can be utilized depending on the end user need. This type of monitoring can enable better care and safety for an animal and can provide peace of mind to animal owners and handlers. The camera can be mounted low to the ground or on a standing post from the ground-mounted spool assembly enclosure. If desired, for a birds eye view, a taller flag pole type pole can be mounted atop the spool control housing to look down upon the yard and animal, enabling a greater visibility of a larger percentage of the yard area of interest.

When there is a need to pull the animal closer to the spool assembly location, which is the origin of the tether cable, the smartphone app or like computer or a switch function on the housing of the spool system can retract the cable slowly and safely. If desired, a level sensing switch can be implemented into the collar and wirelessly communicated to the system to know whether the animal is lying on its side or in an upright standing, sitting, or lying position. Scenarios for this can include the preservation of safety of the animal or others in the vicinity of the tethered animal. Further, force at the pulling motor source can be measured and if higher than a walking pet would generate, the motor can stop pulling or pull gently intermittently to literally walk the dog back to or towards the spool assembly enclosure without pulling too hard or literally dragging the animal across the ground.

In one scenario, if an animal approaches the driveway upon identifying a familiar vehicle when a primary or familiar pet owner/handler drives in the driveway, to enable the driver to conveniently remain in the vehicle, but avoid vehicle-animal close proximity or contact, the smartphone app can retract the animal via cable well in advance of the vehicle's arrival in the driveway. Further, GPS coordinates of a smartphone with the Leash Control System app installed can be utilized to automatically trigger the smart phone app to retract the animal to a safe distance from a driveway and approaching vehicle. Confirmation can be provided to the phone app that the cable and attached pet has or has not been fully retracted to a safe location. If more time is needed to gently pull the pet to the safe zone, an earlier GPS-based coordinate can be used to activate the "Pull to Safety" command. Audio commands to the pet can be used in combination with the aforementioned functionality through a smart phone app either as prerecorded or in real-time to the speaker on the spool assembly enclosure to command the dog to clear the area, such as but not limited to "SIT", "go to the door", "lets go in", "GET BACK" or other appropriate familiar command specific to the property and owner/handler scenario.

Similarly, a visitor on foot, or on a bicycle, cart, scooter or the like can trigger a programmed action via triggering a motion sensing sensor, such as but not limited to an infrared motion sensor or camera during daylight or night time when entering a region such as a driveway, sidewalk, portion of a yard or the like of the animal-accessible area such as: retract the cable to a safe distance if extended, limit extension to a shortened cable length if somewhat retracted, advise the owner/handler of the visitor's presence, activate the camera, enable a speaker and microphone so the smartphone app can be used to conduct a one-way or two-way conversation with the visitor, or talk to the animal. Location of the presence sensors can be mounted on the spool assembly or a nearby structure such as a building, deck, a driveway side post disguised as a Pagoda Landscape light or the like, and directed to an area that includes or excludes the tethered animal depending on the layout of the area of interest to be monitored.

When an animal might stop moving to sit or lay down, if there is still light tension on the tethering cable, the system can extend the cable slightly. Upon the animal becoming upright again, and or moving, the slack can be retracted to the previous length setting if near the perimeter pursuant to avoiding undesired object contact. If the animal is too near the perimeter and risks perimeter violation or animal safety this feature may not be able to be deployed.

Implementing a speaker in the reel housing assembly or in the vicinity mounted to a building structure can enable commands directed to the animal or persons in proximity. Any of a variety of different prerecorded messages can be played through the smartphone app by depressing a preset or custom button to summon or direct the behavior of the animal. For example, if it is time for a meal or treats, for the pet to SIT, or DOWN, or COME, to get some water, or any other command. Use of a microphone in the spool housing further enables two-way communication among welcome or unwelcome visitors or those present in the vicinity of the animal's tethered range.

Turning now to FIGS. 3-11, an exemplary powered dog tether in accordance with the present disclosure is illustrated and identified generally by reference numeral 100. Although this description refers primarily to tethering a dog, aspects of the present disclosure are applicable to virtually any animal. The powered dog tether 100 generally includes a frame 102 supported by wheels 104. The frame 102 supports a tether system 110 adapted to control extension and retraction of a cable 112 that has a distal end configured to be attached to a collar or harness of an animal for controlling movement of the animal within a defined space surrounding the powered dog tether 100.

A plurality of stakes 116 are provided for anchoring the powered dog tether 100 to the ground. The stakes 116 are spaced about a periphery of the frame and are supported at an angle relative to the frame 102 such that the stakes 116, when driven into the ground, remain within the footprint of the powered dog tether 100. Other anchoring arrangements are contemplated, such as a semi-permanent foundation that can be installed in the ground and to which the powered dog tether 100 can be releasably secured.

Figure 5:
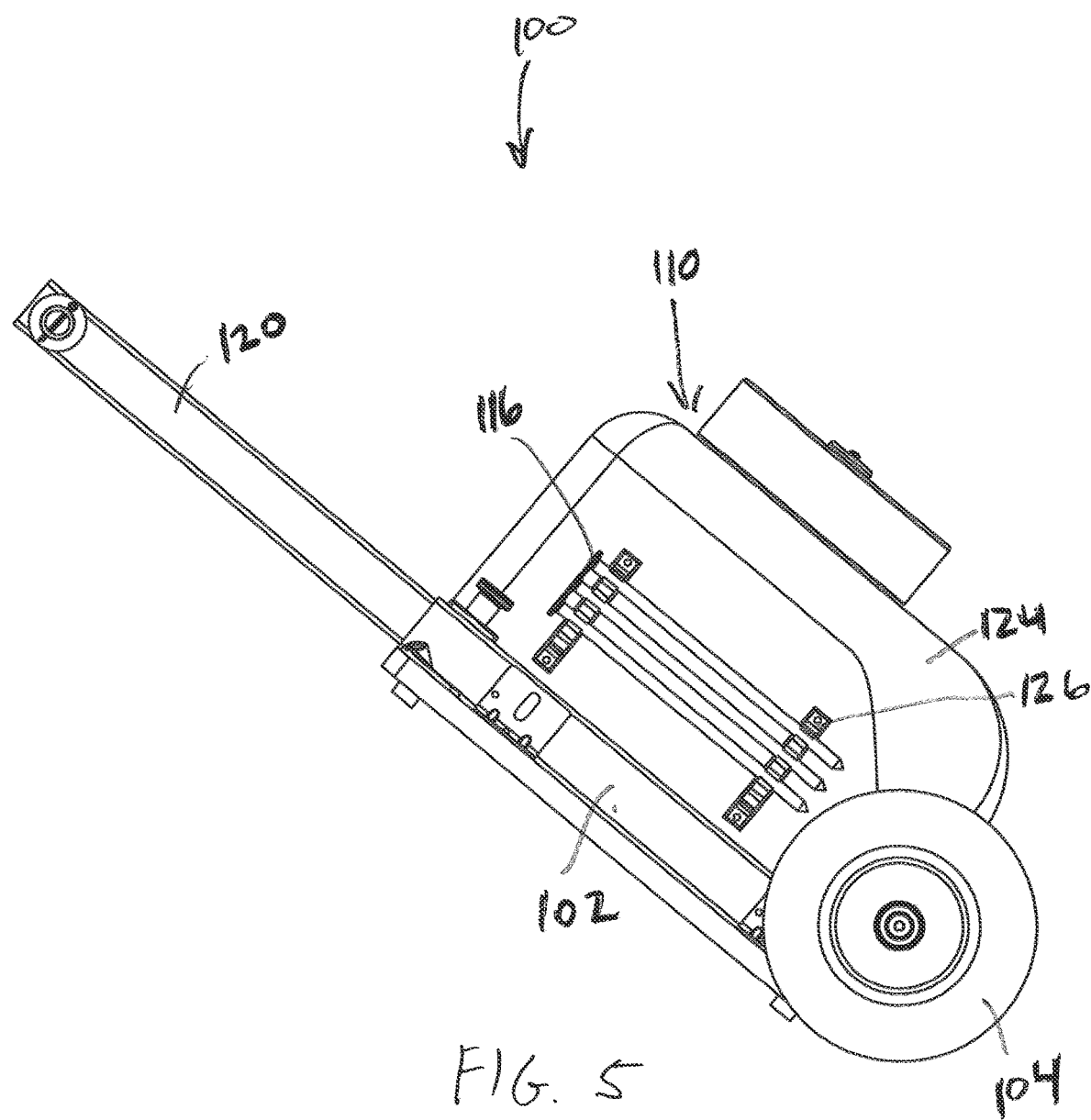
FIG. 5 is side view of a tether system in accordance with the present disclosure.
Figure 6:
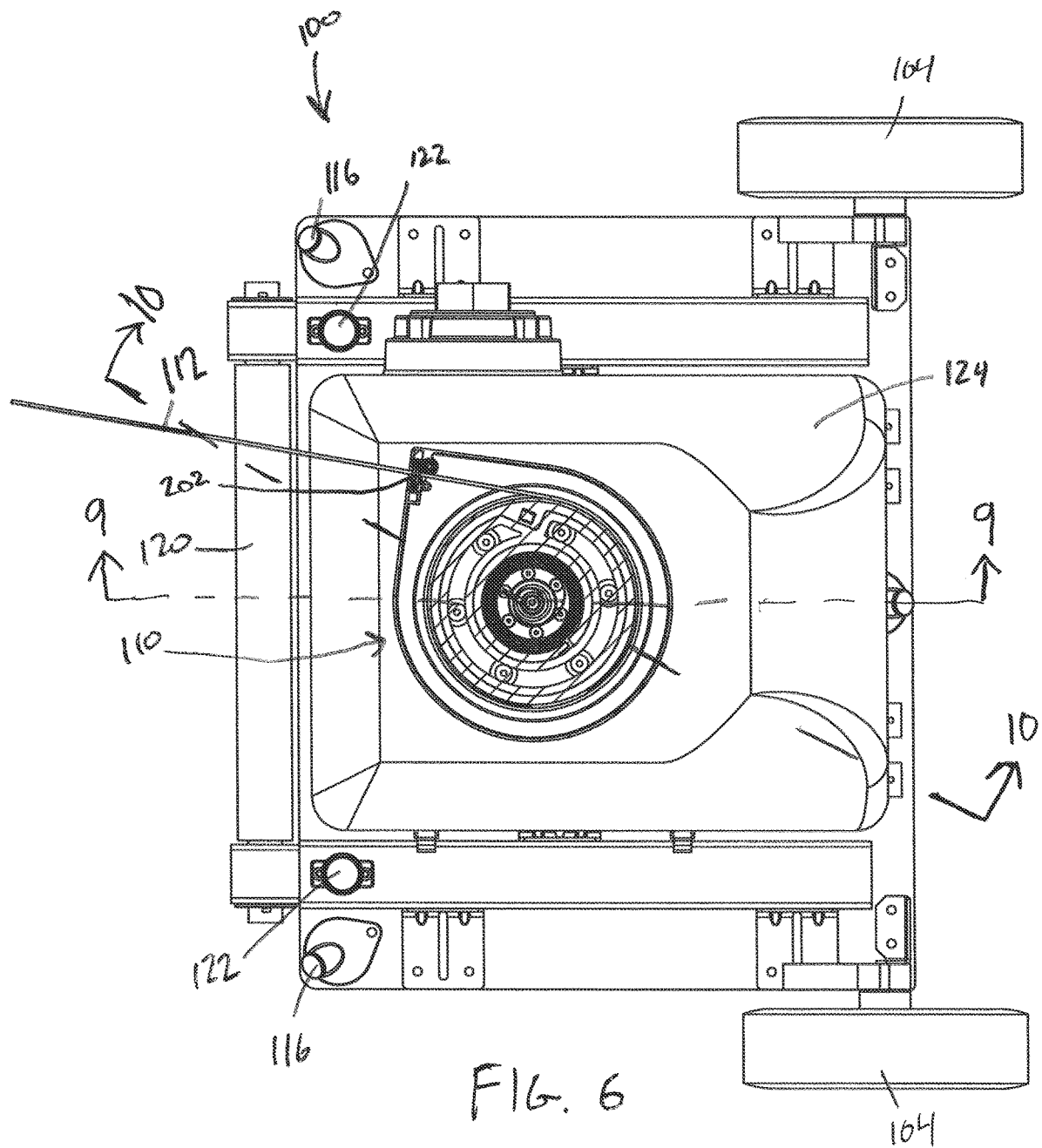
FIG. 6 is an overhead cross-sectional view of a tether system in accordance with the present disclosure.

The frame 102 includes a telescoping handle 120 that can be extended, as shown in FIG. 5, to allow a user to tilt the powered dog tether 100 onto wheels 104 for movement of the powered dog tether 100 over the ground. In certain applications, the wheels 104 can be solid plastic wheels or the like. In other applications, pneumatic tires can be provided. The wheels 104 are supported by the frame such that they generally do not touch the ground when the powered dog tether 100 is in a use position, but support the powered dog tether 100 for movement across the ground when in the tilted position of FIG. 5. Lock pins 122 secure the handle in the stowed and extended positions.

The powered dog tether 100 further includes a shroud 124 that encloses the components of the tether assembly 110. The shroud 124 protects the components of the tether assembly 110 from the elements and prevents contact with the components of the tether assembly 110 by the animal, user or others. An upper surface of the shroud 124 has a smooth, contoured surface to prevent the cable 112 from hanging up thereon. Stake holders 126 are provided on an exterior surface of the shroud 124 for holding additional stakes 116 or storing them during transport.

Figure 7A:
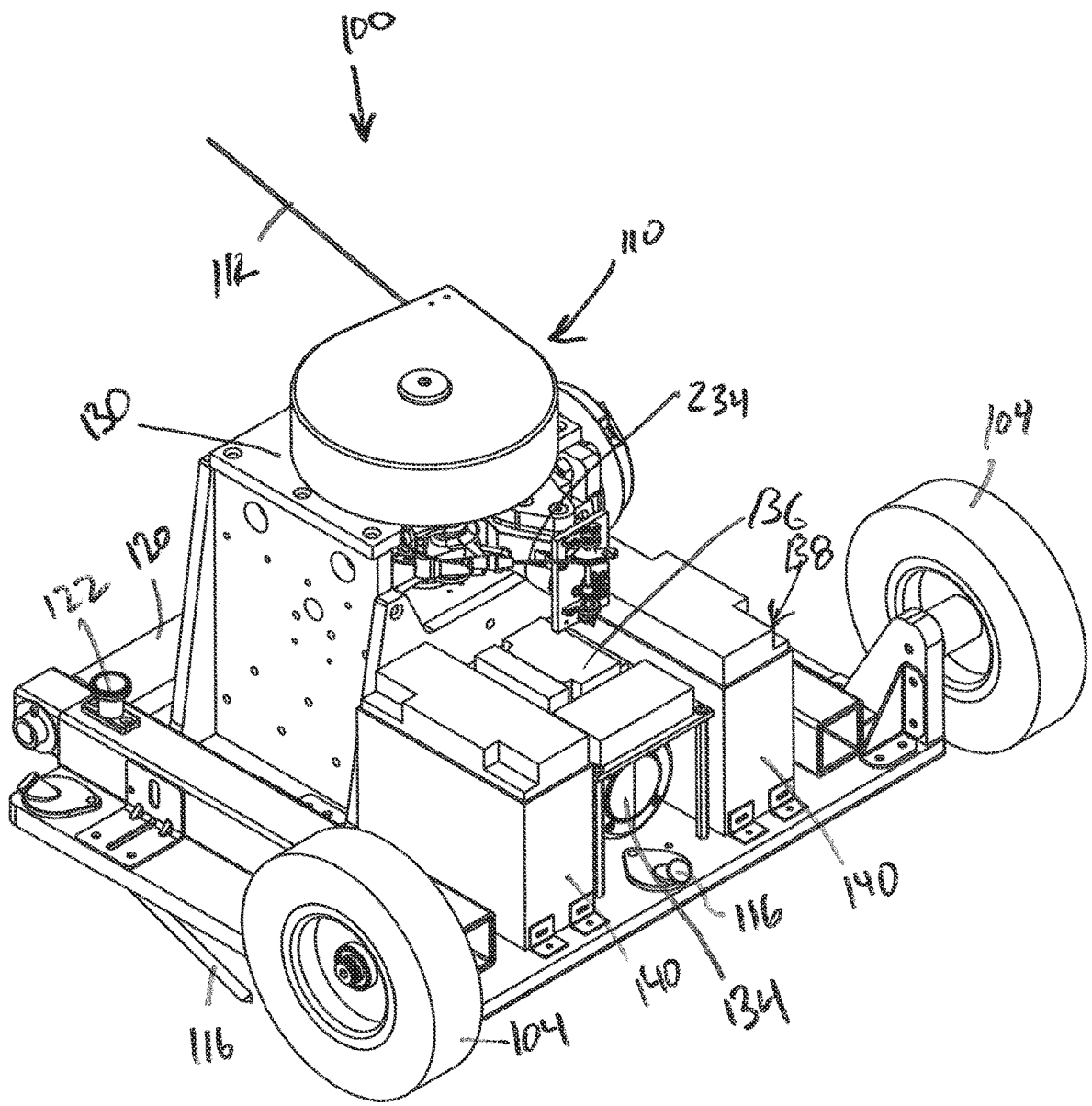
FIG. 7A is perspective view of the tether system with the shroud removed.
Figure 7B:
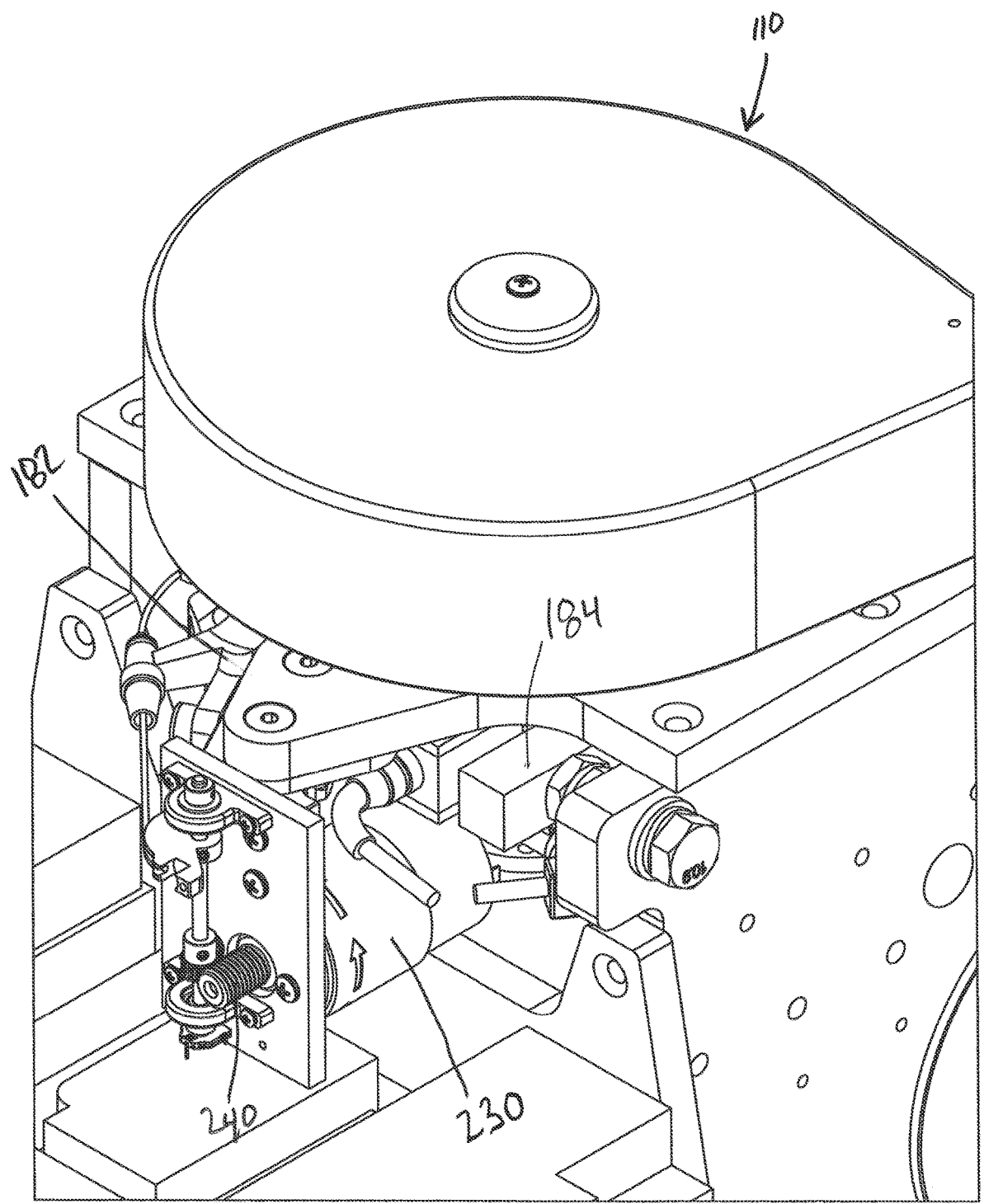
FIG. 7B is an enlarged perspective view of the brake assembly of the present disclosure.
Figure 8:
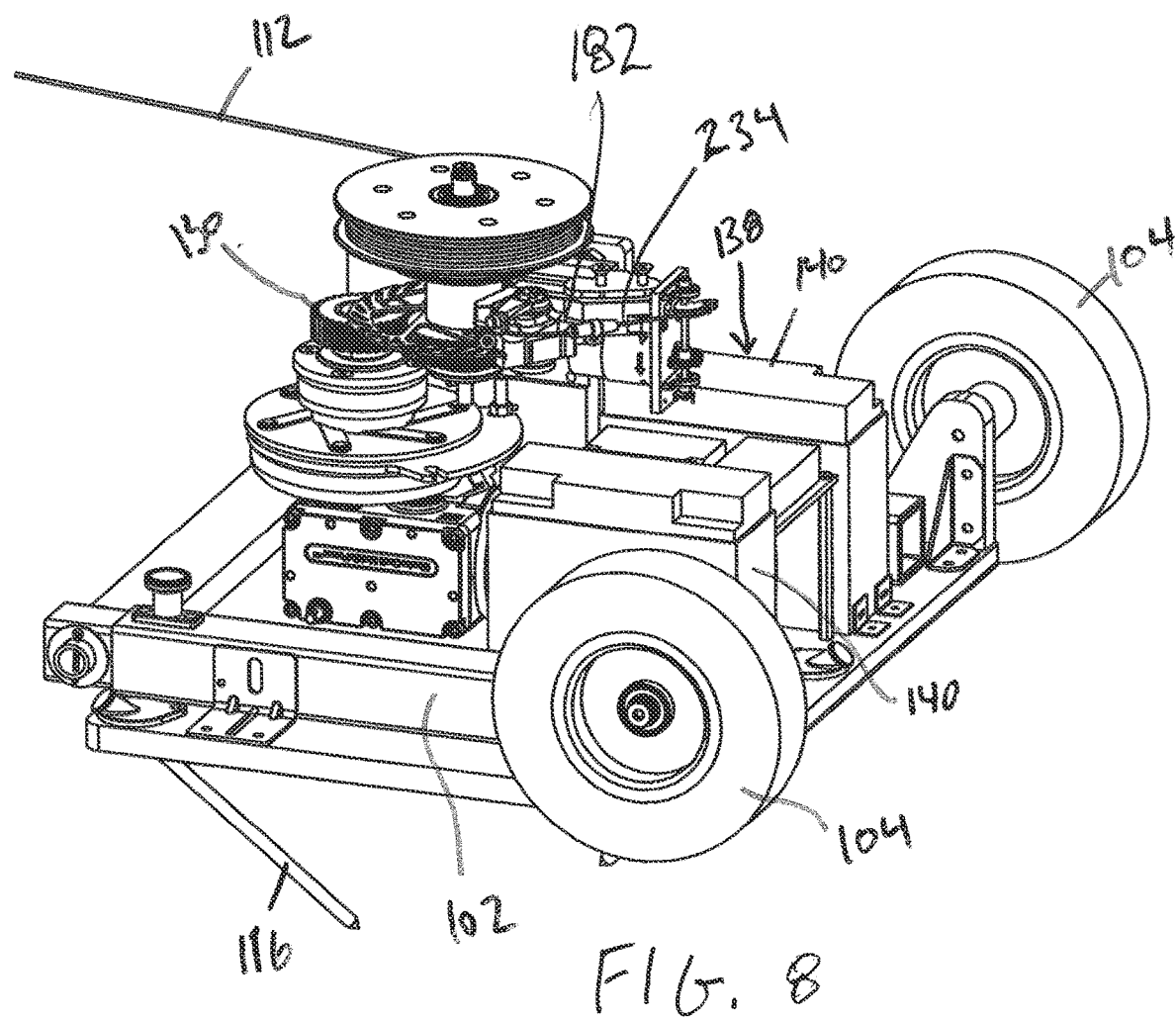
FIG. 8 is a perspective view of the tether system with additional concealing components removed.
Figure 9:
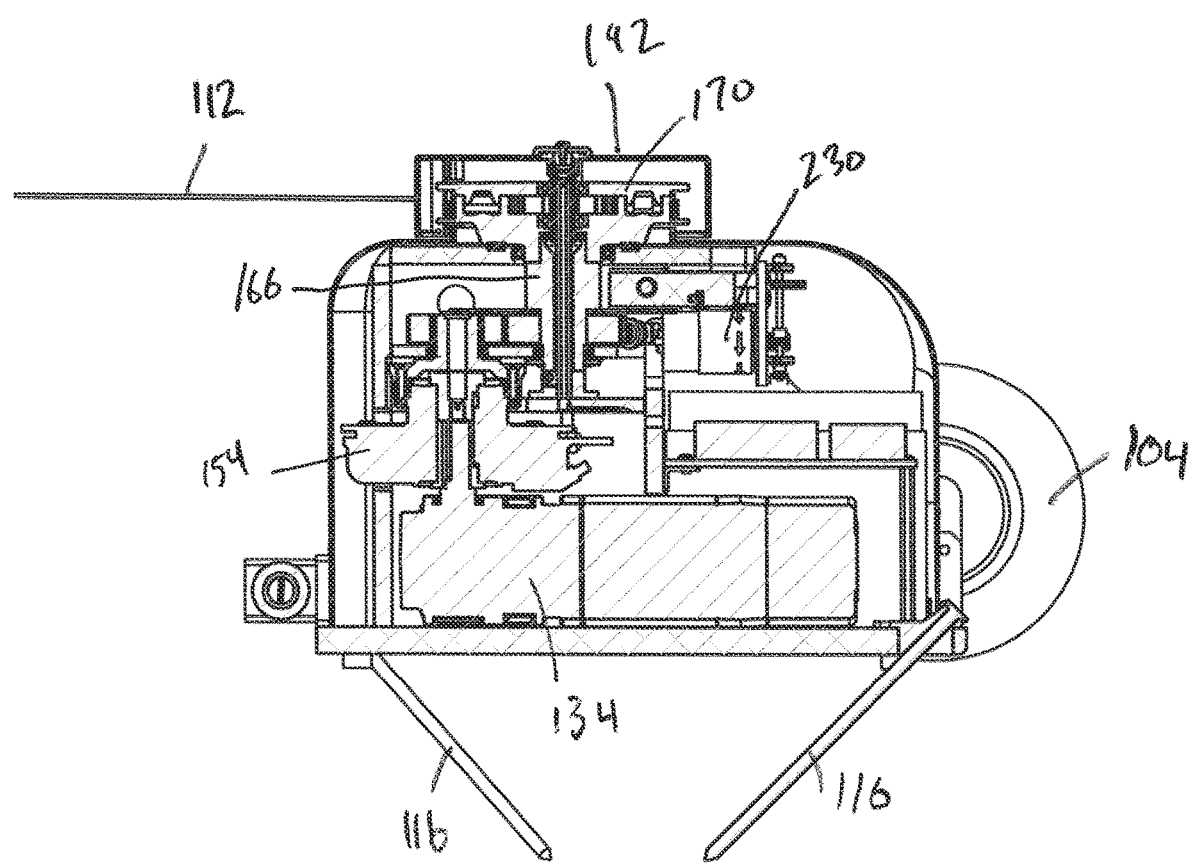
FIG. 9 is a cross-sectional view taken along the line 9-9 in FIG. 6.
Figure 10:
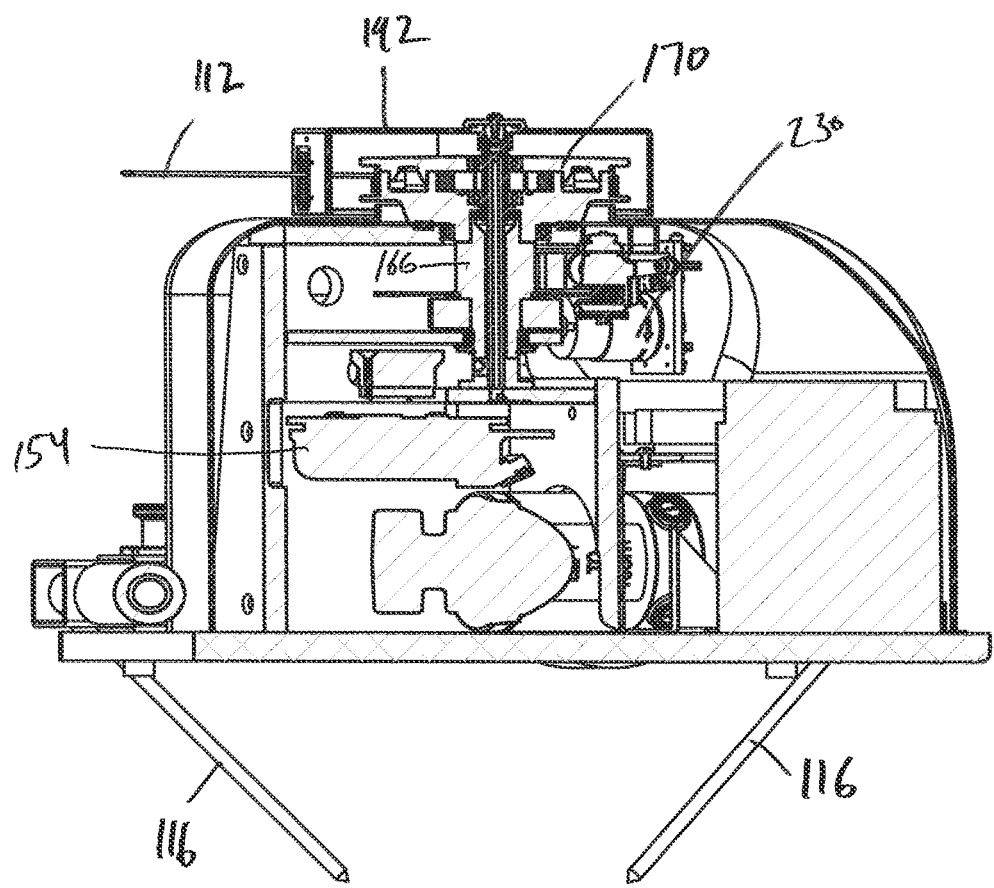
FIG. 10 is a cross-sectional view taken along the line 10-10 in FIG. 6.

With reference to FIGS. 7 and 8, the shroud 124 and other concealing components have been removed and the basic components of the tether system 110 are shown. The tether system 110 generally includes a tether drive 130, an electric drive motor 134 coupled to the tether drive 130, electronic/controller 136, and a power supply 138 for supplying power to the various components of the powered dog tether 100 (as described in connection with FIG. 1) including the electric motor 134, controller, sensors, communications interface, etc. The power supply in the illustrated embodiment includes a pair of batteries 140, but any suitable power supply can be used without departing from the scope of the present disclosure.

Figure 11:
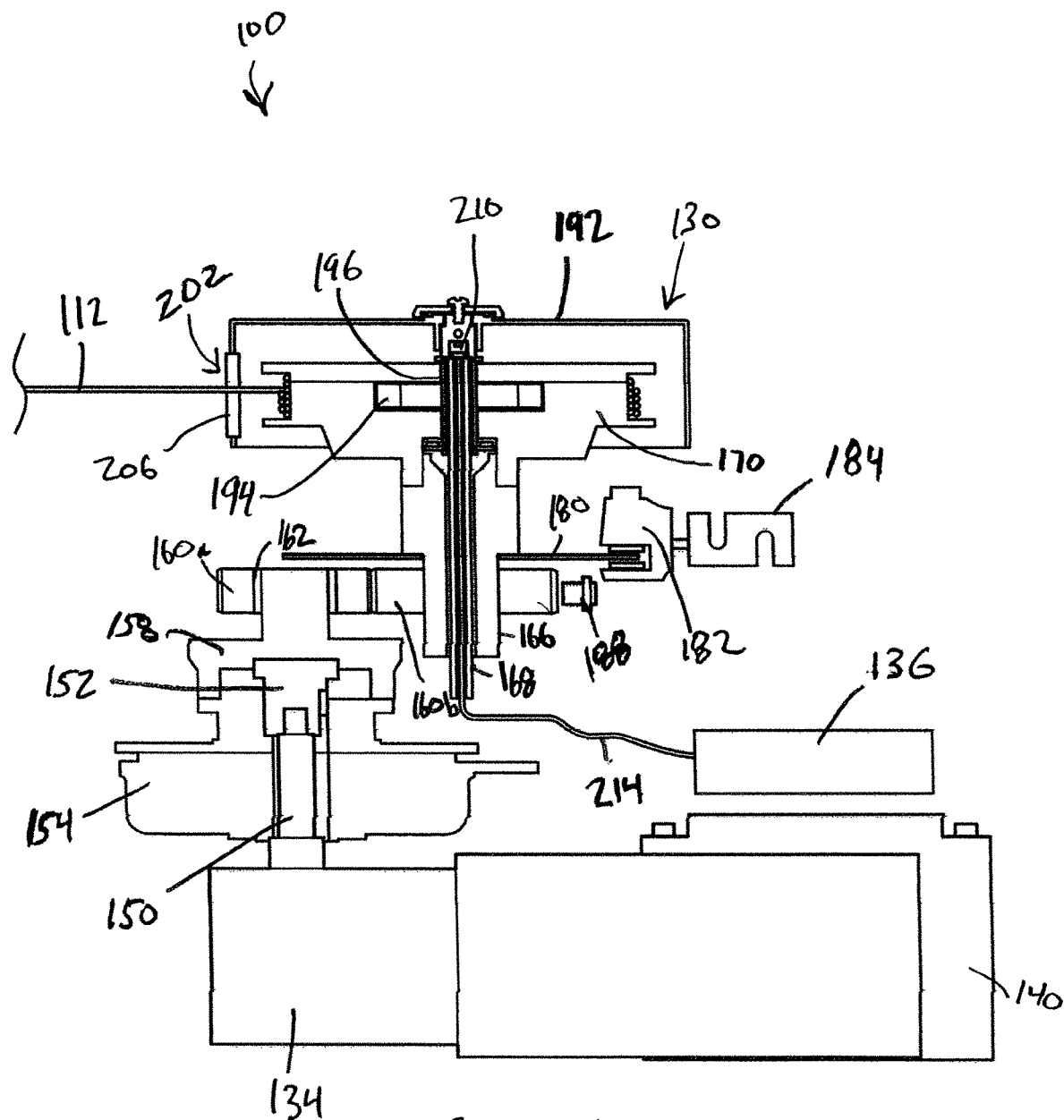
FIG. 11 is a schematic diagram of the main components of the exemplary tether system.

To facilitate an understanding of the complex interworkings of the components of the tether drive 130 shown in FIGS. 6-10, reference is now made to FIG. 11 wherein a simplified version of the powered dog tether 100 is illustrated. Upon understanding the simplified version of the powered dog tether 100 of FIG. 11, a person of ordinary skill in the art will readily understand the more complex version of the powered dog tether 100 shown in FIGS. 3-10.

In FIG. 11, the basic components of the powered dog tether 100 are shown and include the tether drive 130, the electric motor 134, controller 136 and the power supply (e.g., batteries 140). As will be appreciated, an output shaft 150 of the motor 134 is selectively rotationally coupled to an input shaft 152 of the tether drive 130 via a clutch 154. A clutch to gear adapter 158 rotationally couples the input shaft 152 to drive gears 160a and 160b via a one-way bearing 162 interposed between the motor side gear 160a and the clutch 154. Drive gears 160 cooperate to rotate a center shaft 166. Center shaft 166 is supported on a hollow, fixed center column 168 and fixed for rotation with a reel 170. Cable 112 is spooled about the reel 170 for extension/retraction as the reel 170 is rotated in respective directions.

A disk brake assembly for braking rotation of the center shaft 166 includes a rotor 180 coupled to the center shaft 166 and a caliper 182 supported by the frame 102 by a load cell 184. As will be described in further detail below, the disk brake assembly can be actuated to brake rotation of the center shaft 166 and, thus, control the rate of rotation the reel 170. A speed sensor 188 is provided for sensing a rate and/or direction of rotation of the center shaft 166 and/or gear 160b.

The reel 170 is enclosed by a reel cover 192 and engaged and rotationally biased by a power spring 194 to retract the cable 112. An outer portion of the power spring 194 engages with the reel 170 while an inner portion of the power spring 194 engages a cover engagement tube 196. This arrangement allows the reel 170 and reel cover 192 to rotate 360 degrees to permit an animal to go in circles around the device (e.g., at a fixed distance) and not wind or unwind the power spring 194 since the cover engagement tube 196 is rigidly attached to the reel 192 cover and the reel cover 192 follows the cable 112. The cable 112 feeds out of the reel cover 192 through a slot 200 with a cleaning brush 202 (FIG. 6) and a vertical roller 206 on each side. It should be appreciated that rollers can be provided on the top and bottom of the slot 200 as well. The power spring 194 biases the reel cover 192 counterclockwise against the cable 112, so most of the time the cable 112 is riding on a primary roller only. The rollers 206 reduce friction as the cable 112 is pulled in and out and are spaced close to the cable 112 so that if the cable 112 moves laterally (e.g., when the animal is moving in a circle around the device) it pushes against the rollers 206 without much play and rotates the reel cover 192. In this manner, the reel cover 192 generally remains aligned with a cable output direction.

An angle sensor 210 is configured to sense the cable output direction. The angle sensor in the illustrated embodiment includes a magnet fixed to the cover engagement tube 196 and, therefore, angularly fixed to the reel cover 192 and the direction of cable output. A sensor pickup (not shown) is mounted to the center column 168, and picks up rotation and is able to determine the cable output direction. Other sensor types that do not involve magnets also are contemplated. The center column 168 is hollow to allow a wire 214 to be fed down through it for connection to the controller 136 and/or other electronics for providing sensor data thereto.

In operation, various scenarios are encountered as an animal travels around a given space and the powered dog tether 100 is configured to sense certain scenarios and control extension and/or retraction of the cable 112 to control the animal in a predefined manner. As an animal changes its distance radially from the powered dog tether 100, the reel 170 rotates counterclockwise or clockwise to take up or let out the cable 112. The reel 170 is directly engaged with the speed sensor 188 (e.g., a gear tooth sensor) which detects the rotation of the gear 160. Combined with the known circumference of the cable 112 around the reel 170, this information allows the controller 136 to calculate the length of the cable 112 at any given time (e.g., how far the cable 112 has been pulled out=circumference× rotations=distance). The speed sensor 188 can also determine the speed at which the reel 170 is rotating and, therefore, the speed that the cable 112 is moving out or in. The power spring 192 acts as a recoil spring and is configured to remove slack in the cable 112 while allowing the cable 112 to be extending against a slight spring tension. The reel 170 is enclosed by a reel cover 192.

The controller 136 combines the angular information obtained from the angle sensor 210 with the distance information to locate the animal with polar coordinates, which can be translated to cartesian (XY) coordinates as necessary. The controller 136 can then determine the animal's distance from the predefined border and how quickly the animal is moving towards or away from the border.

It should be appreciated that the one way bearing 162 between the motor-side gear 160*a* and the clutch 154 makes it so the power spring 194 does not have to rotate the clutch 154 when recoiling the cable 112, thereby lessening the torque requirements of the power spring 194 and allowing the use of a smaller spring than would otherwise be required. Under normal operation, the clutch 154 is disengaged to allow the reel 170 to rotate independent of the motor 134 so neither the animal nor the spring 194 will have to rotate the motor 134. When powered operation is desired, the clutch 154 is engaged to couple the motor 134 to center shaft 166 to drive the reel 170.

Various example scenarios are described below along with exemplary routines for controlling the animal in accordance with aspects of the present disclosure.

Scenario 1: Stopping an animal moving away from the powered dog tether 100 and towards a predefined border. In this scenario, the powered dog tether 100 determines the animals radial speed (away from the powered dog tether 100) as well as the distance from the animal to the border at its current angular position. Combined with knowledge of the dog's mass (input by the user) the controller 136 will determine to apply the brake to safely and comfortably bring the animal to a stop before it crosses the border. A slow moving animal can get closer to the border than a fast moving animal before the brake is applied, since a slow animal requires less deceleration. A light animal can typically get closer to the border than a heavy animal before the brake is applied, since a heavy animal requires more force to stop and this force typically would be distributed over a larger distance to safely halt the animal.

To stop the animal, the disc brake caliper 182 is actuated to squeeze the disc brake rotor 180, just like any other disc brake. Other brake types could be used. The brake assembly can be a normally engaged brake assembly or a normally disengaged brake assembly depending on a given application. The force applied by the brake assembly should be controlled to avoid braking too aggressively (potentially hurting the animal) or too lightly (not stopping in time). To do this, the controller 136 can be configured to ramp up the application of the brake assembly to its target force (determined by history/calculations) relatively gradually (e.g., less than a second, but not instantaneously). Meanwhile, the animal's speed and acceleration/deceleration is continually monitored by the speed sensor and if the animal is slowing too quickly or slowly the braking force can be adjusted in realtime.

In the illustrated embodiment of FIGS. 3-10, the brake assembly includes an electric motor 230 wherein the braking force is generated by the motor 230 applying tension on a brake cable 234 to drive the caliper 182. It should be appreciated that other brake assemblies and/brake caliper configuration can be employed without departing from the scope of the present disclosure. It should further be appreciated that by mounting the brake caliper 182 to the frame 102 through the load cell 184, the torque applied to the brake rotor 180 can be measured and, in turn, the approximate tension on the cable 112 can be calculated by the controller 136. The tension on the cable 112 can be monitored as another check to make sure the animal isn't being stopped too aggressively.

Scenario 2: Holding an animal at the border. In this scenario, once the animal is stopped, the brake will remain applied to prevent the animal from crossing the border. In the exemplary embodiment, the brake motor 230 is connected via a non-reversible worm gear 240 (see FIG. 7B). This allows braking force to be applied by energizing the brake motor 230 to apply the brake. The brake motor 230 can then be deenergized without losing braking force. To release the brake, the brake motor 230 can subsequently be energized in the reverse direction to release the tension on cable 234.

While the brake is applied, the load cell (e.g., brake caliper mount) monitors the force the animal is pulling with by measuring the torque applied to the caliper 182 by the rotor 180 as the animal continues to pull on the cable 112. When this torque drops to zero the animal has either stopped moving or is moving back towards the powered dog tether 100 (e.g., a slack cable). At such time, the controller 136 is configured to release the brake. In one configuration, the brake is released relatively gradually, so as to not snap the cable 112 when the power spring 194 takes up any slack, but not so slow as to allow the animal to create much slack if it is moving towards the powered dog tether 100. The power spring 194 is then once more free to take up slack in the cable 112 while the speed sensor 188 continues to monitor the radial position of the animal to determine whether the brake needs to be reapplied.

Scenario 3: Pulling animal in from a large radial distance border to a small radial distance border. In this scenario, since the border is allowed to be non-circular, some areas will be farther away from the powered dog tether 100 than others (e.g., larger radial distance). If an animal is moving from an area with a large radial distance allowed to an area with a small radial distance allowed the animal will need to be pulled in (e.g., the radial length of the cable 112 shortened). Just as the powered dog tether 100 uses radial speed and distance combined with dog mass to determine when to brake the reel to stop the animal approaching the border, the PDT 110 uses angular velocity and cable distance combined with animal mass to determine when and how aggressively to pull in the cable using the motor 134. Depending on border shape and the direction the animal is moving, the powered dog tether 100 can also use a combination of angular and radial position/velocity to determine this as well. If the animal is currently moving quickly away from the device (radially), the brake may first be applied to slow the animal to near zero (radial) speed before the motor 134 is activated. To pull the animal towards the powered dog tether 100, the clutch 154 is energized to engage the motor 134 with the clutch side gear 160*a*. At the same time, the motor 134 is energized so as to rotate the reel 170 to rewind the cable 112. Motor speed can be controlled based at least in part on how big of a correction the animal will need to make in its course in order to stay within the border. While the motor 134 is operating to pull in the animal, it is possible for the animal to turn and run towards the powered dog tether 100 at a rate faster than the motor 134 is pulling in the cable 112. If this happens the power spring 194 will automatically take up the slack, rotating the reel 170 faster than the motor 134 is pulling in. This is facilitated by the one way bearing 162 which will disengage and allow the reel 170 to rotate faster than it is being driven by the motor 134 when such conditions arise that the power spring 194 can drive the reel 170 faster than the motor 134. When this occurs, the controller 136 detects a discrepancy between the data received from the speed sensor 188 and the rate at which the motor 134 is being driven to rotate the reel 170. When these data are out of sync (if the reel 170 is moving faster than the motor 134 is driving it), the controller 136 de-energizes the clutch 154 and the motor 134 because the condition that led to the motor being needed is no longer present. In some instances, the motor 134 can be used to pull the animal back within the border if the animal has managed to travel beyond the border, such as by leaping quicker than the brake can react, for example.

The border can be configured in a number of ways. In one example, the powered dog tether 100 is placed in "learn" mode and a user simply walks the desired border while holding a distal end of the cable 112. In the learn mode, the controller 136 monitors and records the coordinates of the border as the cable 112 moves 360 degrees around the powered dog tether 100. Once this is complete, the powered dog tether 100 can check the proposed border to determine if it the system is capable of maintaining the border exactly as proposed. If there are some areas of the border that the powered dog tether 100 cannot allow the animal to reach without compromising its ability to keep the animal out of other areas (like the backside of a garden plot, assuming the garden is off limits) it will adjust the border accordingly. In some applications, a buffer can be added by offsetting the border inward by some amount. This buffer could account for differences between how the user is holding the distal end of the cable 112 and where the same is attached to the animal, as well as giving some margin of error in case the dog is able to cross the proposed border momentarily or if errors in the sensors, calculations, etc. result in the powered dog tether 100 being slightly inaccurate in its determination of distance or angle.

In other configurations, the input and resultant border can be drawn and viewed on a smartphone or computer. If the position of the powered dog tether 100 in one's yard was known, a satellite image could be used as an underlay. In other applications, artificial intelligence could be used to generate a border based on photos, videos or other information relating to the area.

The powered dog tether 100 can include additional features to assist with controlling the animal. In one embodiment, the powered dog tether 100 employs a learning algorithm to track the animals movements over time to determine how it behaves and reacts to the powered dog tether 100 and or other stimulants in the environment. Statistics relating to maximum developed torque, speed, etc. can be used as inputs to the braking and pulling algorithms.

In some embodiments, the powered dog tether 100 can include various monitors and/or input/output devices for monitoring and/or communication with the animal or anyone within the vicinity of the powered dog tether 100. For example, the powered dog tether 100 can include a microphone and speaker to allow a user with a smartphone or computer to listen to what is happening in the yard and talk to the animal through the powered dog tether 100. The powered dog tether 100 can also be configured to play pre-recorded sounds (such as the owner's commands) to try to get the animal to change behavior or come in if needed. Similarly, cameras can be mounted on the powered dog tether 100 to send video to a user. In some arrangements, a camera can advantageously be mounted to the reel cover such that the camera would be expected to always be pointed in the direction of the animal as the animal travels about the powered dog tether 100. In other arrangements, a series of cameras can be located around the device and these cameras could be configured to stitch together their images to create a 360° view.

The powered dog tether 100 can further include a plurality of sensors for monitoring the surrounding environment including temperature, rain, and humidity sensors. Data from the sensors could monitor the weather in the yard and convey this information to the owner, even alerting them with a notification if conditions are undesirable for the animal. These conditions could include heavy rain, high temperature/humidity, high temperature/humidity combined with high activity by the dog.

In an alternative embodiment, the load cell and one-way bearing can be replaced by a rotational damper assembly that permits limited relative rotation of the reel 170 relative to the center shaft. Various types of rotational dampers can be used, and generally include two concentric sections rotationally engaged with backlash, such that if the driving half changes direction it would need to rotate a few degrees before engaging the other driven half again thus allowing a small amount of relative rotation between the sections. Springs or cushioning material can be interposed between the sections to damp shock loads therebetween. Separate rotation sensors for the two sections can be provided to monitor the angular rotation of each section. When the angular rotation of each section is in sync, the sections are rotating together. When the angular rotation of one section becomes out of sync with the other section, an event has occurred, such as the animal stopping or generating slack in the cable 112, and action is taken according to the context of activity is being conducted at the time of the rotational discrepancy.

Figure 12:
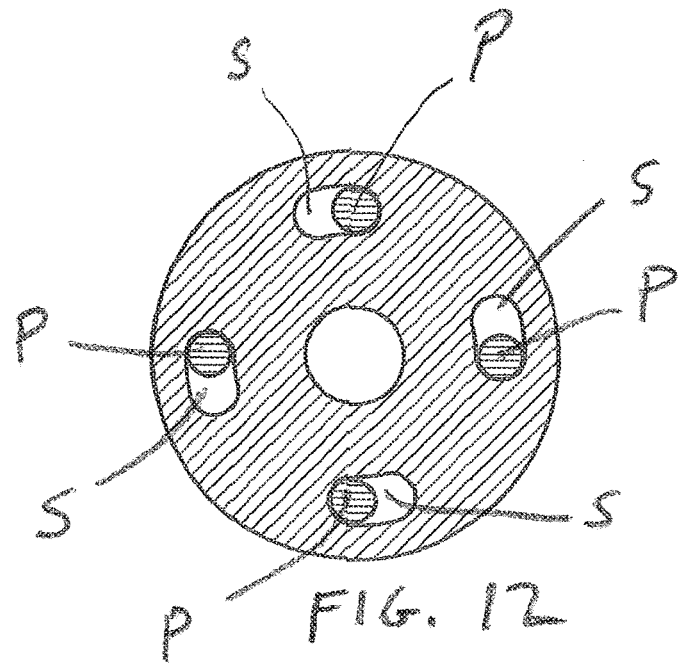
FIG. 12 is a cross-sectional view of a rotational damper in a first position of another exemplary embodiment of the present disclosure.
Figure 13:
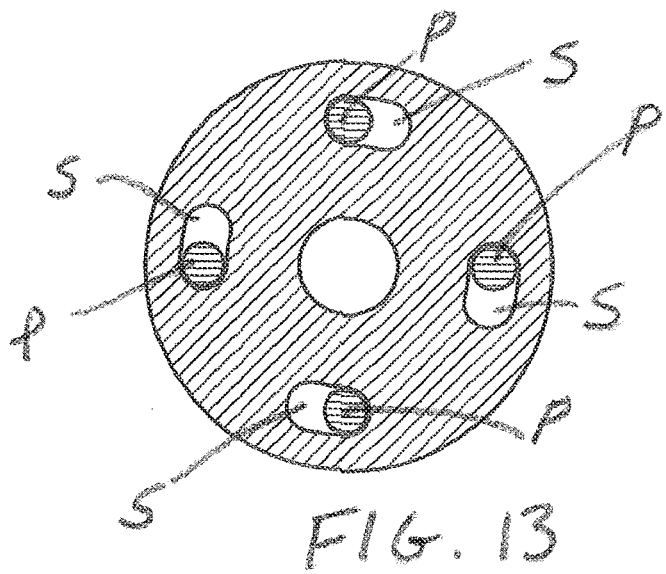
FIG. 13 a cross-sectional view of the rotational damper in a second position.
Figure 14:
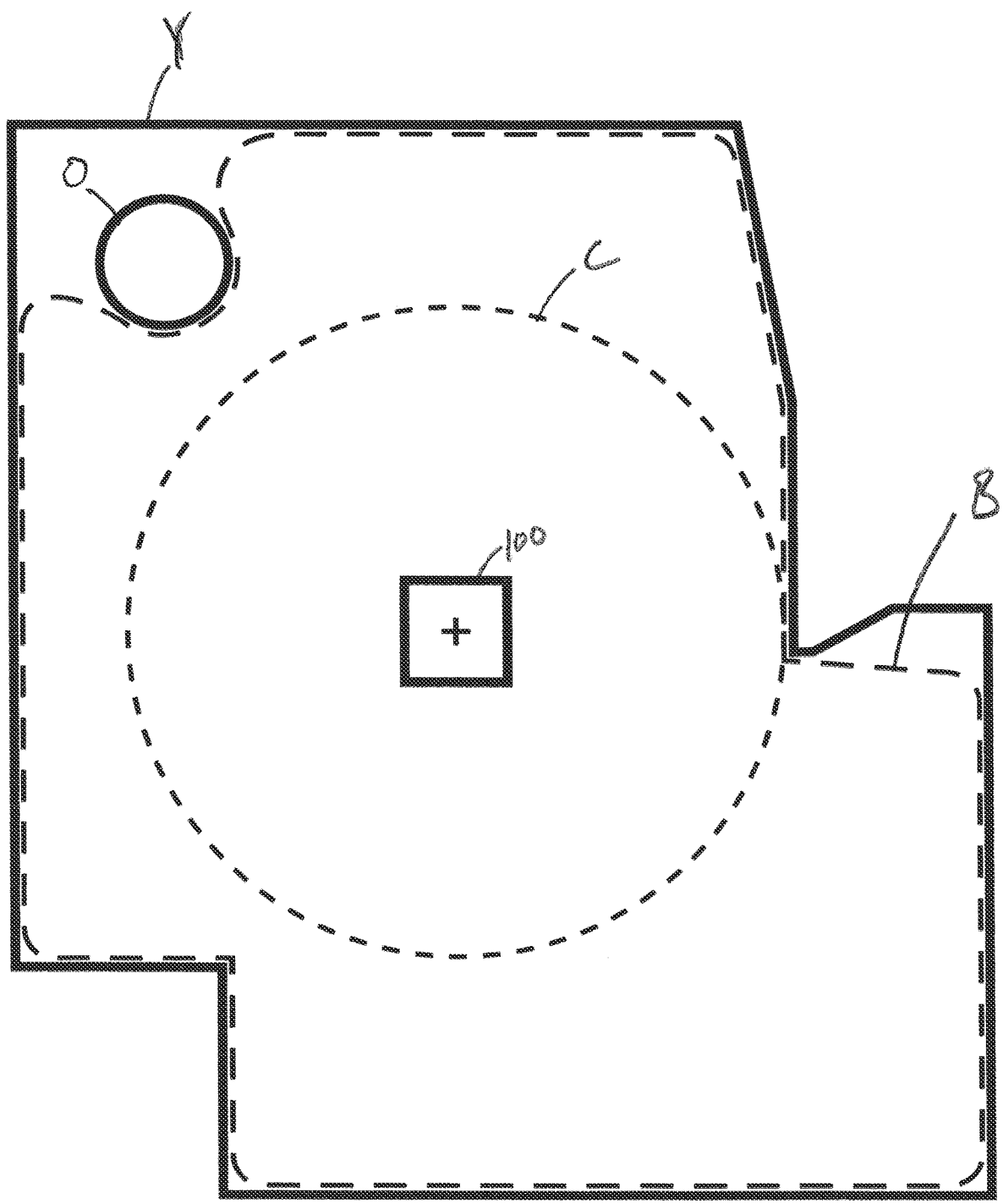
FIG. 14 is a schematic diagram illustrating an exemplary boundary achievable with the tether system of the present disclosure.

For example, with reference to FIGS. 12 and 13, when under a braking condition, the animal would be pulling the line out, turning the reel counterclockwise. The brake would be applying a resistive force in the opposite direction. If the brake is fixed to the posts P and the reel is fixed to the slots S, they would engage as seen in FIG. 13, with the posts pushing clockwise against the slots S. If the animal reverses direction, coming now towards the device, the power spring will rotate the reel in the opposite direction until the slots S hit the pins on the other end as seen in FIG. 14. When this happens, the rotational sensors will go out of sync and the device will know that the brake is no longer needed.

During a pulling in action where the motor is retracting the cable, the motor is driving the posts in the clockwise direction, with the animal resisting and pulling the reel in the counterclockwise direction. If the animal reverses direction and the sensors go out of sync the device will know to stop pulling.

In this alternative embodiment, since the one-way bearing has been eliminated, the motor can be reversed to spool out line. If an animal has been stationary for some time (e.g., (presumed to be lying down), the motor can spool out a very small amount of line to reduce the tension in the cable. The brake can then be applied to prevent the power spring from pulling recoiling the cable, and the motor and clutch can be disengaged to save power. This will eliminate the tension on the line and make it more comfortable for the animal. The device will monitor for the rotation sensors to go out of sync and when they do (indicating dog motion) it will release the brake and resume normal operations.

It should be appreciated that in any embodiment, drive motor can act in place of, or as a supplement, to the brake assembly. For example, the drive motor can be coupled to the reel with no power applied, in which case the drive motor will act as generator when the cable is pulled out, generating electricity while providing resistance to movement (braking). This arrangement provides no holding power when the reel is stopped, though, so in some arrangements the brake assembly would be desired or the system would need to actively control the drive motor in the reverse direction (retract) proportional to the tension in the cable in order to keep the tether from extending. The drive motor can also be driven in reverse when the line is being pulled out to provide more braking force than being coupled with no power applied.

Turning to FIG. 14, it will now be appreciated the powered dog tether 100 is capable of keeping an animal confined to a complex, predefined border such as example border B within a yard Y. The powered dog tether 100 allows the animal to roam a greater percentage of the yard Y than a fixed length tether, which would be limited to the area of circle C, while still keeping the dog within the confines of the yard Y. Further, obstacle O can be avoided by placing the obstacle O outside the example border B.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A tether system for an animal comprising:
a reel;
a tether supported on the reel for extension and retraction in response to rotation of the reel;
a motor operatively connected to the reel for rotating the reel to extend and retract the tether;
at least one sensor configured to sense a condition of at least one of the reel, the tether or the motor; and
a controller for controlling the motor to extend and retract the tether based at least in part on data received from the at least one sensor.

2. The tether system of claim 1, wherein the at least one sensor includes one or more of an encoder for measuring rotation of the reel, an angular position sensor for measuring an angle of extension of the tether, or tension sensor for measuring tension in the tether.

3. The tether system of claim 1, further comprising a frame supporting the reel, the motor and the controller.

4. The tether system of claim 3, further comprising at least one wheel mounted to the frame for supporting the tether system for movement across the ground.

5. The tether system of claim 1, wherein the at least one sensor includes an angular position sensor for sensing an angular direction in which the tether extends from the reel, and a rotational sensor for sensing a rate of rotation of the reel.

6. The tether system of claim 5, further comprising a brake assembly for braking rotation of the reel.

7. The tether system of claim 6, further comprising a spring for rotationally biasing the reel to retract the tether.

8. The tether system of claim 7, further comprising a clutch for selectively coupling the motor to the reel.

9. The tether system of claim 8, further comprising a one-way bearing interposed between the motor and the reel such that the reel can rotate faster than a rate at which the motor drives the reel when retracting the tether.

10. The tether system of claim 9, wherein the brake assembly includes a caliper and a sensor for sensing an amount of braking torque developed by the caliper.

11. The tether system of claim 10, further comprising a reel cover adapted to enclose the reel, wherein the reel cover is rotatable relative to a shroud of the tether system in response to a change in angular direction of the tether.

12. The tether system of claim 11, wherein the reel cover supports the angular position sensor.

13. The tether system of claim 12, further comprising at least one battery for providing power to at least one of the motor, controller, or at least one sensor.

14. The tether system of claim 12, wherein the shroud includes stake holders.

15. A method for controlling a tether system for an animal comprising:
sensing at least one of an angular direction of extension of the tether, a radial length of the tether, or a rate of extension of the tether; and
activating, at least in part based on data generated by the sensing, at least one of a brake for braking extension of the tether or a motor for retracting the tether;
wherein the tether system includes a reel, a tether supported on the reel for extension and retraction in response to rotation of the reel, a motor operatively connected to the reel for rotating the reel to extend and retract the tether, and a controller for controlling the motor to extend and retract the tether based at least in part in data received from at least one sensor.

* * * * *